US012724417B2

(12) United States Patent
Fang et al.

(10) Patent No.: US 12,724,417 B2
(45) Date of Patent: Sep. 1, 2026

(54) POLARIZATION DIRECTION CONTROL METHOD, REMOTE CONTROL DEVICE AND STORAGE MEDIUM

(71) Applicant: SZ DJI TECHNOLOGY CO., LTD., Shenzhen (CN)

(72) Inventors: Mu Fang, Shenzhen (CN); Yifeng Qin, Shenzhen (CN); Chao Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 57 days.

(21) Appl. No.: 18/759,781

(22) Filed: Jun. 28, 2024

(65) Prior Publication Data

US 2024/0353852 A1 Oct. 24, 2024

Related U.S. Application Data

(63) Continuation of application No. PCT/CN2021/144032, filed on Dec. 31, 2021.

(51) Int. Cl.
*G05D 1/226* (2024.01)
*G05D 109/20* (2024.01)

(52) U.S. Cl.
CPC ......... *G05D 1/226* (2024.01); *G05D 2109/20* (2024.01)

(58) Field of Classification Search
CPC .......................... G05D 1/226; G05D 2109/20
USPC .............................................................. 701/2
See application file for complete search history.

(56) References Cited

U.S. PATENT DOCUMENTS 10,868,609 B1 * 12/2020 Kossin ..................... H04B 7/10
2016/0141765 A1 * 5/2016 Moon ................. H01Q 21/293 343/812
2019/0341694 A1 * 11/2019 Zou .................... H01Q 21/0031
2019/0386400 A1 * 12/2019 Wu ........................ H01Q 5/371
2022/0140911 A1 * 5/2022 Ackerman ............. H04B 10/69 398/142
2023/0280763 A1 * 9/2023 Lu .......................... B64U 50/10 701/7

(Continued)

FOREIGN PATENT DOCUMENTS

CN 108521835 A 9/2018
CN 209962120 U 1/2020

(Continued)

OTHER PUBLICATIONS

International Search Report of PCT/CN2021/144032 (Aug. 29, 2022).

*Primary Examiner* — Mahmoud S Ismail

(57) ABSTRACT

A method, a remote control device, and a system are provided. The method may include: determining an initial synthetic polarization direction based at least in part on transmission antenna information of a movable platform; obtaining attitude data indicative of an attitude change of the movable platform; and determining a target synthetic polarization direction based at least in part on the attitude data and the initial synthetic polarization direction, wherein a remote control device is configured to communicate with the moveable platform using the target synthetic polarization direction. By adopting the method, the communication quality between the remote control device and the moveable platform can be improved.

20 Claims, 9 Drawing Sheets

(56) References Cited

U.S. PATENT DOCUMENTS

2023/0361481 A1* 11/2023 Aboserwal .............. H01Q 3/36

FOREIGN PATENT DOCUMENTS

| | | | |
|---|---|---|---|
| CN | 213845482 | U | 7/2021 |
| CN | 214067946 | U | 8/2021 |
| WO | 2021083866 | A | 5/2021 |

* cited by examiner

POLARIZATION DIRECTION CONTROL METHOD, REMOTE CONTROL DEVICE AND STORAGE MEDIUM

RELATED APPLICATIONS

This application is a continuation application of PCT application No. PCT/CN2021/144032, filed on Dec. 31, 2021, and the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technical field of movable platforms, for example, unmanned aerial vehicles (UAVs), especially to a polarization direction control method, a remote control device and a storage medium.

BACKGROUND

A movable platform such as a UAV is an unmanned aircraft operated using radio remote control equipment and onboard program control devices. It is used in various fields of our lives, such as aerial photography, parcel delivery, disaster rescue, wildlife observation, disease monitoring, mapping, news reporting, power line inspection, disaster relief, and film production, etc. Users control the UAV by sending signal commands with a remote control device. The UAV transmits signals back to the remote control device, such as real-time image signals, allowing users to see the footage captured by the UAV in real time with the remote control device. However, due to changes in the UAV's attitude during flight, the electromagnetic waves received by the remote control device may have various polarization directions. How to avoid polarization mismatch as much as possible is an urgent problem that needs to be addressed.

SUMMARY

The present disclosure provides a polarization direction control method, a remote control device and a storage medium, which can improve the communication quality between the remote control device and a movable platform, such as a UAV.

In a first aspect, the present disclosure provides a method, including: determining an initial synthetic polarization direction based at least in part on transmission antenna information of a movable platform; obtaining attitude data indicative of an attitude change of the movable platform; and determining a target synthetic polarization direction based at least in part on the attitude data and the initial synthetic polarization direction, where a remote control device is configured to communicate with the moveable platform using the target synthetic polarization direction.

In a second aspect, the present disclosure provides a remote control device, including: at least one storage medium storing at least one set of instructions; and at least one processor in communication with the at least one storage medium, where during operation, the at least one processor executes the at least one set of instructions to cause the remote control device to at least: determine an initial synthetic polarization direction based at least in part on transmission antenna information of a movable platform, obtain attitude data indicative of an attitude change of the movable platform, and determine a target synthetic polarization direction based at least in part on the attitude data and the initial synthetic polarization direction, where the remote control device is configured to communicate with the moveable platform using the target synthetic polarization direction.

In a third aspect, the present disclosure provides a system, including: a remote control device; a movable platform; at least one storage medium storing at least one set of instructions; and at least one processor in communication with the at least one storage medium, where during operation, the at least one processor executes the at least one set of instructions to cause the remote control device to at least: determine an initial synthetic polarization direction based at least in part on transmission antenna information of the movable platform, obtain attitude data indicative of an attitude change of the movable platform, and determine a target synthetic polarization direction based at least in part on the attitude data and the initial synthetic polarization direction, where the remote control device is configured to communicate with the moveable platform using the target synthetic polarization direction.

Correspondingly, some exemplary embodiments of the present disclosure also provides a computer-readable storage medium, a computer program or instruction(s) is stored in the computer-readable storage medium, and when the computer program or instruction(s) is executed on a remote control device, the remote control device executes the above-mentioned polarization direction control method.

The method proposed in the present disclosure involves obtaining the current attitude information of a movable platform such as a UAV; based on the current attitude information of the movable platform, determining a target synthetic polarization direction. This allows a remote control device to transmit or receive electromagnetic waves in the target synthetic polarization direction by antennas with the first and second polarization directions. This approach significantly avoids polarization mismatch caused by attitude changes during movable platform movement, thereby improving the communication quality between the remote control device and the movable platform.

BRIEF DESCRIPTION OF THE DRAWINGS

In order to clearly illustrate the technical solutions of the embodiments of the present disclosure, the following will briefly introduce the drawings for the description of some exemplary embodiments. Apparently, the accompanying drawings in the following description are some exemplary embodiments of the present disclosure. For a person of ordinary skill in the art, other drawings may also be obtained based on these drawings without creative efforts.

DETAILED DESCRIPTION

The technical solutions in some exemplary embodiments of the present disclosure will be clearly described below in conjunction with the accompanying drawings. It is apparent that the described embodiments are only part of the embodiments of the present disclosure, not all of them. Based on these exemplary embodiments of the present disclosure, all other embodiments obtained by a person of ordinary skill in the art without creative efforts fall within the scope of protection of the present disclosure.

Some exemplary embodiments of the present disclosure provide a polarization direction control method, which involves obtain the current attitude information of a movable platform such as a UAV, and then based on the current attitude information of the UAV, the target synthetic polarization direction is determined. This allows a remote control device to transmit or receive electromagnetic waves in a target synthetic polarization direction by antennas with first and second polarization directions. The target synthetic polarization direction herein is one of a plurality of synthetic polarization directions.

During the movement of a movable platform such as the flight of a UAV, its attitude may change, causing the angle of the antenna on the UAV to change as well. Therefore, when a remote control device determines a target synthetic polarization direction based on the UAV's current attitude information, it ensures that the target synthetic polarization direction matches the current angle of the UAV's antenna. In this way, when the remote control device transmits or receives electromagnetic waves in the target synthetic polarization direction with the antennas with the first and second polarization directions, it significantly avoids polarization mismatch. This makes it easier to receive signals sent by the UAV and also ensures that control commands sent by the remote control device are more easily received by the UAV, thereby improving the communication quality between the remote control device and the UAV.

Figure 1:
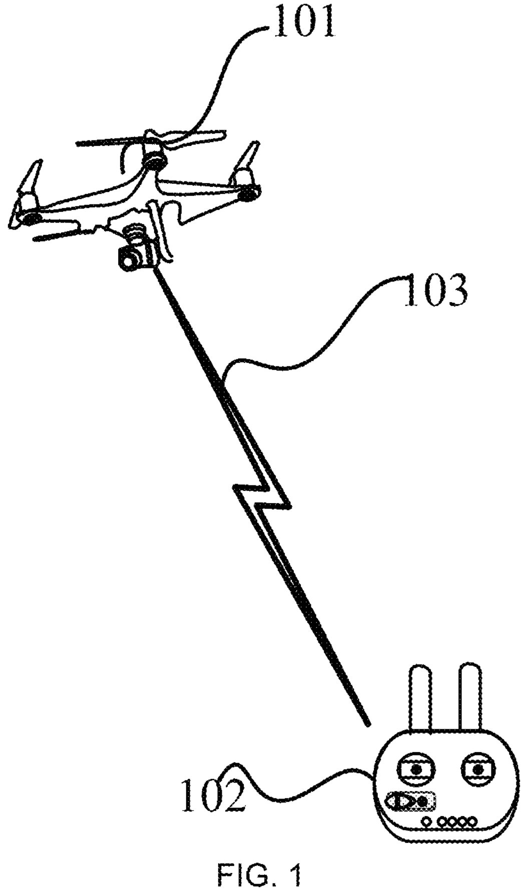
FIG. 1 is a schematic diagram of the structure of a control system according to some exemplary embodiments of the present disclosure.

Based on the polarization direction control method mentioned above, the present disclosure provides a control system in some exemplary embodiments. Referring to FIG. 1, it illustrates the structure of a control system provided in some exemplary embodiments of the present disclosure, where 101 represents a UAV, 102 represents a remote control device, and 103 represents a communication link between the UAV 101 and the remote control device 102. Communication is established between the UAV 101 and the remote control device 102. In FIG. 1, the UAV 101 can be a movable platform, and the remote control device 102 can be a control unit/device of the remote control device. It is noted that the movable platform herein can include, but are not limited to, aircrafts, vehicles, ships, intelligent robots, etc. The movable platform can be manned or unmanned. For example, the aircraft includes unmanned aerial vehicles (UAVs). The aircraft can include, but is not limited to, manned aircraft, logistics aircraft, aerial photography aircraft, agricultural plant protection aircraft, rescue aircraft, performance aircraft, etc. The above are merely some examples, and the types of aircraft are not specifically limited in the present disclosure.

In the control system described in FIG. 1, the remote control device 102 can send control commands to the UAV 101 based on the communication link, such as flight instructions. UAV 101, in turn, can send operational results to the remote control device 102 via the communication link, such as real-time image signals or current attitude information.

However, whether the UAV 101 can receive signal commands from the remote control device 102 and whether the remote control device 102 can receive data from the UAV 101 largely depends on the communication quality therebetween. When the communication quality is poor, the UAV 101 may not be able to receive commands from the remote control device 102. Therefore, in the control system described in FIG. 1, the polarization direction control method mentioned above can be adopted. This method enables the remote control device 102 to more accurately receive data from the UAV and also facilitates the reception of control commands sent from the remote control device by the UAV. This is advantageous for improving the communication quality between the remote control device and the UAV.

Figure 2A:
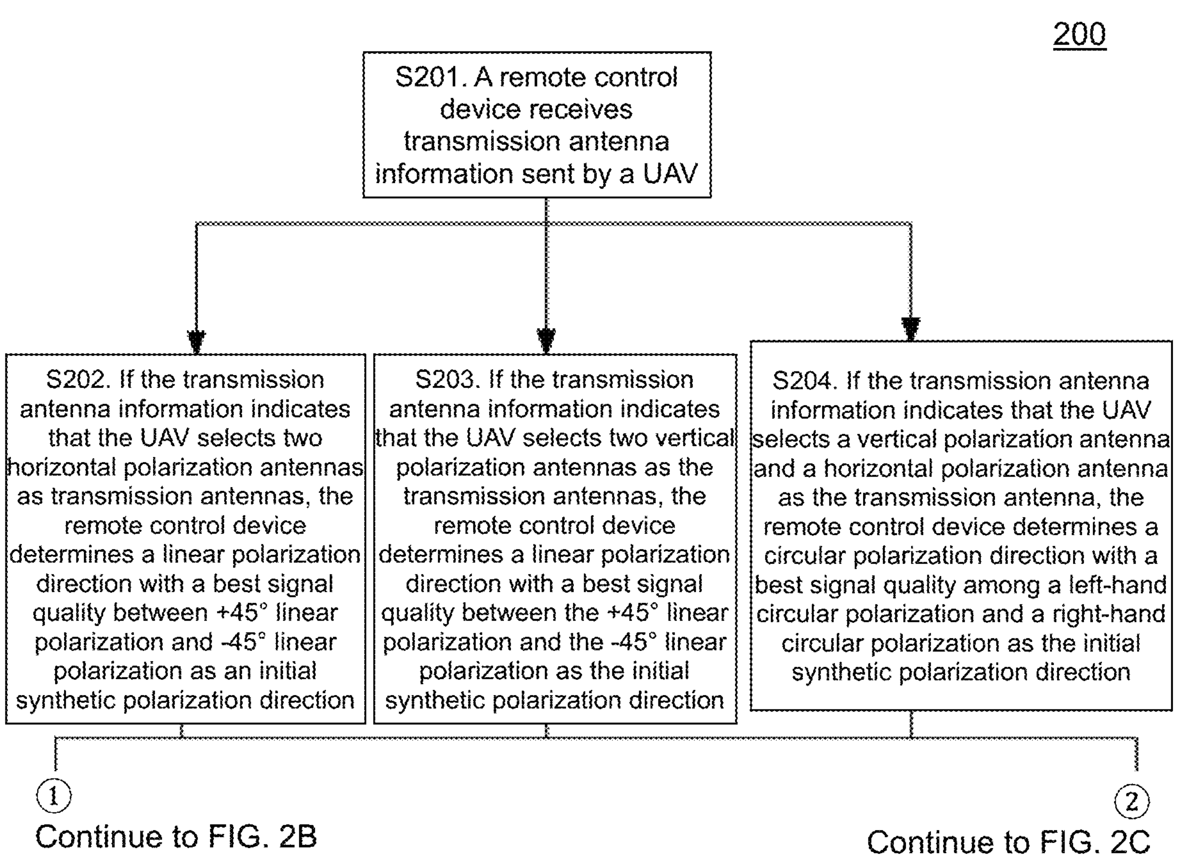
FIG. 2A-2C illustrate a process 200 for polarization direction control according to some exemplary embodiments of the present disclosure.
Figure 2B:
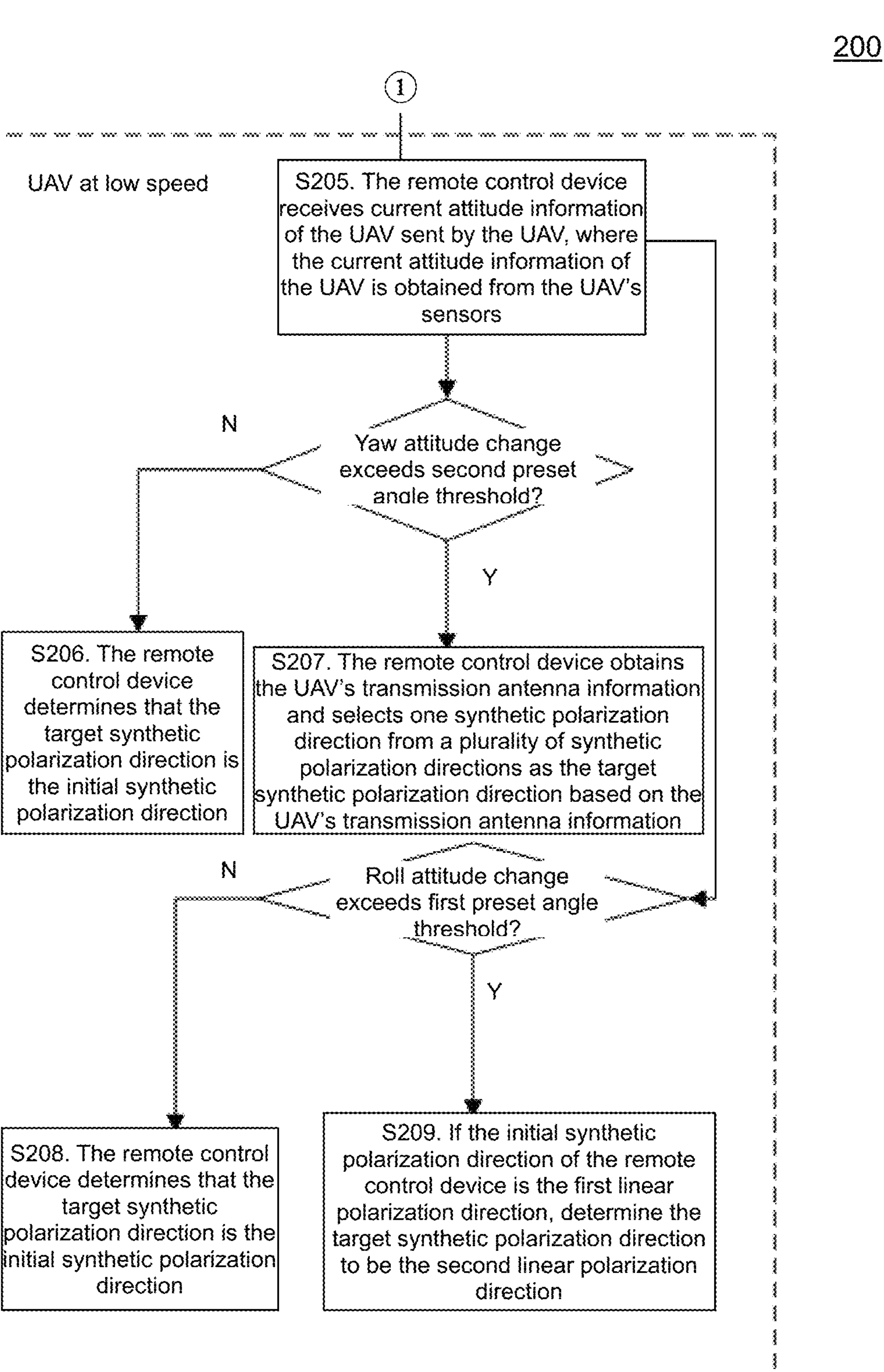
Figure 2C:
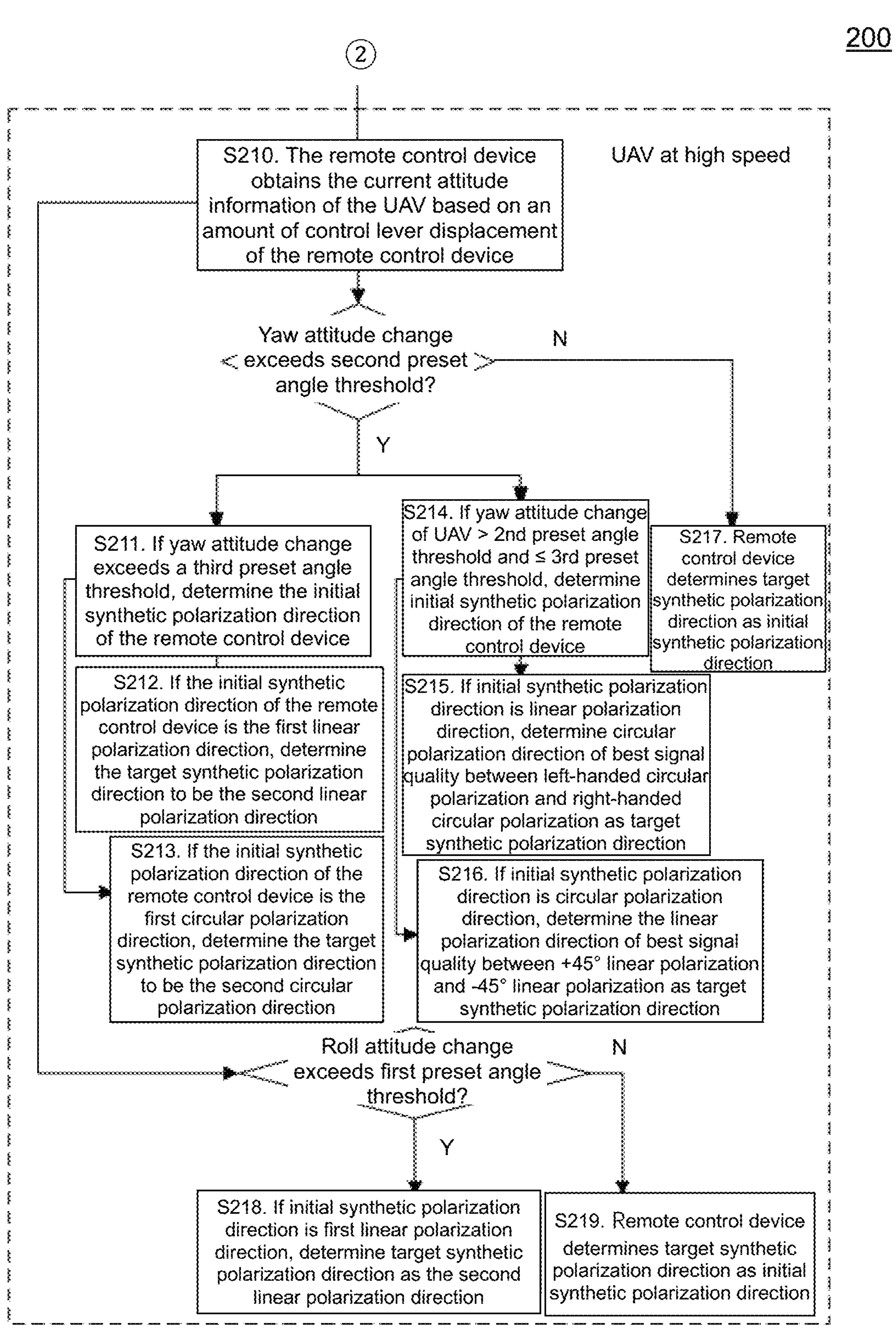

As shown in FIG. 2A-2C, which illustrates a process 200 for polarization direction control provided in some exemplary embodiments of the present disclosure, the method herein is mainly used to illustrate the full process of this solution. This process 200 can be applied in the remote control device, where the UAV and the remote control device establish a communication link, and they can transmit signals to each other based on this communication link. Some or all aspects of the process 200 (or any other processes described herein, or variations and/or combinations thereof) may be performed by one or more processors onboard a movable object, a remote control device, any other system or device or a combination thereof. Some or all aspects of the process 200 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes. The polarization direction control method described in herein can be executed by the remote control device, specifically by a processor of the remote control device. FIG. 2A-2C includes specific steps S201 to S219:

S201: A remote control device receives transmission antenna information sent by a UAV.

In some exemplary embodiments of the present disclosure, the UAV's rear arms are equipped with two horizontal polarization antennas, while the front landing gear of the UAV is equipped with two vertical polarization antennas. These antennas for emitting electromagnetic waves are positioned relative to the orientation of the UAV and the remote control device. The remote control device is equipped with antennas of a first polarization direction and antennas of a second polarization direction. These antennas are capable of work together emitting or receiving electromagnetic waves of various synthetic polarization directions.

S202: If the transmission antenna information indicates that the UAV selects two horizontal polarization antennas as transmission antennas, the remote control device determines a linear polarization direction with a best signal quality between +45° linear polarization and −45° linear polarization as an initial synthetic polarization direction.

S203: If the transmission antenna information indicates that the UAV selects two vertical polarization antennas as the transmission antennas, the remote control device determines a linear polarization direction with a best signal quality between the +45° linear polarization and the −45° linear polarization as the initial synthetic polarization direction.

S204. If the transmission antenna information indicates that the UAV selects a vertical polarization antenna and a horizontal polarization antenna as the transmission antenna, the remote control device determines a circular polarization direction with a best signal quality among a left-hand circular polarization and a right-hand circular polarization as the initial synthetic polarization direction.

If the UAV is currently flying at a low speed, the remote control device executes steps S205 to S209.

S205: The remote control device receives current attitude information of the UAV sent by the UAV, where the current attitude information of the UAV is obtained from the UAV's sensor(s).

The remote control device can determine the UAV's attitude change based on the current attitude information and the reference attitude information of the UAV. The attitude change includes the yaw attitude change and/or the roll attitude change. The reference attitude information is the UAV's attitude information at the time when the initial synthetic polarization direction is determined.

If the remote control device determines that the yaw attitude change has not exceeded a second preset angle threshold, then step S206 is executed. If the remote control device determines that the yaw attitude change has exceeded the second preset angle threshold, then step S207 is executed. Herein, the second preset angle threshold can be 45°, or it can be another angle, such as 40°. The embodiments of the present disclosure do not limit this.

S206: The remote control device determines that the target synthetic polarization direction is the initial synthetic polarization direction.

S207: The remote control device obtains the UAV's transmission antenna information and selects one synthetic polarization direction from a plurality of synthetic polarization directions as the target synthetic polarization direction based on the UAV's transmission antenna information.

The plurality of polarization directions includes +45° linear polarization, −45° linear polarization, right-hand circular polarization, and left-hand circular polarization.

In some exemplary embodiments, if the transmission antenna information indicates that the UAV selects two horizontal polarization antennas as transmission antennas, the remote control device determines the linear polarization direction with the best signal quality between +45° linear polarization and −45° linear polarization as the target synthetic polarization direction. If the transmission antenna information indicates that the UAV selects two vertical polarization antennas as transmission antennas, the remote control device determines the linear polarization direction with the best signal quality between +45° linear polarization and −45° linear polarization as the target synthetic polarization direction. If the transmission antenna information indicates that the UAV selects one vertical polarization antenna and one horizontal polarization antenna as transmission antennas, the remote control device determines the circular polarization direction with the best signal quality between left-handed circular polarization and right-handed circular polarization as the initial synthetic polarization direction.

If the remote control device determines that the roll attitude change exceeds a first preset angle threshold, then step S209 is executed; if the remote control device determines that the roll attitude change does not exceed the first preset angle threshold, then step S208 is executed. The first preset angle threshold herein can be 90°, but it can also be other angles, such as 80°. The embodiments of the present disclosure do not limit this.

S208: The remote control device determines that the target synthetic polarization direction is the initial synthetic polarization direction.

S209: If the initial synthetic polarization direction of the remote control device is the first linear polarization direction, determine the target synthetic polarization direction to be the second linear polarization direction.

If the UAV is currently flying at a high speed, the remote control device executes steps S210 to S219.

S210: The remote control device obtains the current attitude information of the UAV based on an amount of control lever displacement (also referred to as a "control amount") of the remote control device. If the remote control device determines that the yaw attitude change exceeds a second preset angle threshold, then step S211 and the subsequent steps corresponding to step S211, or step S214 and the subsequent steps corresponding to step S214, are executed; if the remote control device determines that the yaw attitude change does not exceed the second preset angle threshold, then step S217 is executed.

S211: If the yaw attitude change exceeds a third preset angle threshold, determine the initial synthetic polarization direction of the remote control device.

The third preset angle threshold is greater than the second preset angle threshold. The third preset angle threshold can be 90°, but it can also be other angles, such as 80°. The embodiments of the present disclosure do not limit this.

S212: If the initial synthetic polarization direction of the remote control device is the first linear polarization direction, determine the target synthetic polarization direction to be the second linear polarization direction.

When the first linear polarization direction is +45° linear polarization, the second linear polarization direction is −45° linear polarization; when the first linear polarization direction is −45° linear polarization, the second linear polarization direction is +45° linear polarization.

S213: If the initial synthetic polarization direction of the remote control device is the first circular polarization direction, determine the target synthetic polarization direction to be the second circular polarization direction.

When the first circular polarization direction is left-handed circular polarization, the second circular polarization direction is right-handed circular polarization; when the first circular polarization direction is right-handed circular polarization, the second circular polarization direction is left-handed circular polarization.

S214: If the yaw attitude change of the UAV exceeds the second preset angle threshold and is less than or equal to the third preset angle threshold, determine the initial synthetic polarization direction of the remote control device.

S215: If the initial synthetic polarization direction of the remote control device is a linear polarization direction, the remote control device determines the circular polarization direction with the best signal quality between left-handed circular polarization and right-handed circular polarization as the target synthetic polarization direction.

S216: If the initial synthetic polarization direction of the remote control device is a circular polarization direction, determine the linear polarization direction with the best signal quality between +45° linear polarization and −45° linear polarization as the target synthetic polarization direction.

S217: The remote control device determines that the target synthetic polarization direction is the initial synthetic polarization direction.

If the remote control device determines that the roll attitude change exceeds the first preset angle threshold, then step S218 is executed; if the remote control device determines that the roll attitude change does not exceed the first preset angle threshold, then step S219 is executed.

S218: If the initial synthetic polarization direction of the remote control device is the first linear polarization direction, determine the target synthetic polarization direction to be the second linear polarization direction.

The first linear polarization direction is +45° linear polarization, then the second linear polarization direction is −45° linear polarization; the first linear polarization direction is −45° linear polarization, then the second linear polarization direction is +45° linear polarization.

S219: The remote control device determines that the target synthetic polarization direction is the initial synthetic polarization direction.

The specific implementation and beneficial effects of steps S201 to S219 can be referred to in the corresponding descriptions for FIGS. 3 to 7. However, the embodiments of the present disclosure do not elaborate on this herein.

Figure 3:
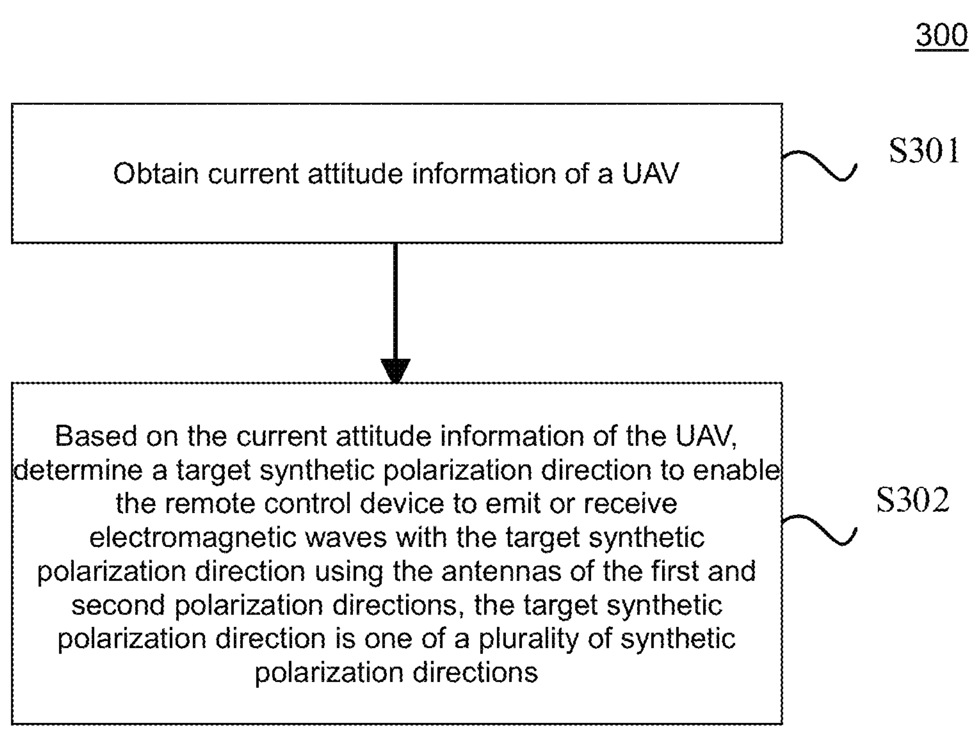
FIG. 3 illustrates a process 300 for polarization direction control according to some exemplary embodiments of the present disclosure.

Based on the above control system, the present disclosure provides a method for controlling polarization direction. Referring to FIG. 3, a process 300 for controlling polarization direction according to some exemplary embodiments of the present disclosure, there is a communication connection established between the UAV and the remote control device, allowing them to transmit signals to each other based on this communication connection. The method for controlling polarization direction shown in FIG. 3 can be executed by the remote control device or the UAV, specifically by at least one processor of the remote control device or the UAV. FIG. 3 includes steps S301 and S302.

S301: Obtain current attitude information of a UAV.

There is a communication connection established between the UAV and the remote control device, allowing them to transmit signals to each other based on this communication connection. The remote control device is equipped with antennas of a first polarization direction and antennas of a second polarization direction. These antennas can emit or receive electromagnetic waves of various synthetic polarization directions. For example, an antenna in the first polarization direction can be a horizontal polarization antenna, and an antenna of the second polarization direction can be a vertical polarization antenna. The remote control device can send or receive electromagnetic waves with a polarization direction of +45° or −45° using the horizontal polarization antenna and the vertical polarization antenna.

In some exemplary embodiments, the attitude information may include one or more of yaw attitude information, roll attitude information, and pitch attitude information.

S302: Based on the current attitude information of the UAV, determine a target synthetic polarization direction. This is to enable the remote control device to emit or receive electromagnetic waves with the target synthetic polarization direction using the antennas of the first and second polarization directions. The target synthetic polarization direction is one of a plurality of synthetic polarization directions.

It should be understood that due to the UAV's changing attitude during flight, the angles of the antennas on the UAV may also change. Therefore, when the remote control device determines the target synthetic polarization direction based on the current attitude information of the UAV, it ensures that the target synthetic polarization direction matches the current angle of the UAV's antennas. This greatly reduces polarization mismatch when the remote control device emits or receives electromagnetic waves with the target synthetic polarization direction using the antennas of the first and second polarization directions. This makes it much easier to receive signals sent by the UAV and also facilitates the reception of control commands sent by the remote control device to the UAV, thus enhancing the communication quality between the remote control device and the UAV.

In some exemplary embodiments, the UAV is equipped with a polarization-direction antenna, which can be a vertical polarization antenna, a horizontal polarization antenna, or a circular polarization antenna. The UAV can send or receive electromagnetic waves based on this antenna.

In some exemplary embodiments, the UAV can be equipped with a plurality of polarization-direction antennas. For instance, the rear arms of the UAV can have two antennas of the third polarization direction, while the front landing gear can have two antennas of the fourth polarization direction. The antennas used for emitting electromagnetic waves depend on the relative orientation between the UAV and the remote control device. For example, when the UAV is flying towards the remote control device with its head facing it, the UAV can use the two antennas of the fourth polarization direction set on the front landing gear to transmit information to the remote control device. When the UAV is flying away from the remote control device with its tail facing it, it can use the antennas of the third polarization direction set on the rear arms to transmit information to the remote control device. The third and fourth polarization directions can be linear polarization or circular polarization, or one can be linear while the other is circular. The present disclosure does not impose limitations on this. Additionally, the UAV can also be equipped with 2 antennas, 3 antennas, or any other number of antennas; the present disclosure does not restrict the number of antennas that can be provided on the UAV.

In some exemplary embodiments, the first polarization-direction antenna is a horizontal polarization antenna, and the second polarization-direction antenna is a vertical polarization antenna. Various polarization directions include +45° linear polarization, −45° linear polarization, right-handed circular polarization, and left-handed circular polarization. During flight, the UAV transmits signals with the transmission antenna. Changes in the UAV's attitude lead to changes in the angle of the transmission antenna, and various interferences in space may result in polarization mismatch. The +45° linear polarization, −45° linear polarization, right-handed circular polarization, and left-handed circular polarization ensure that the remote control device can receive at least some polarization components to avoid polarization mismatch to the greatest extent possible. Additionally, by only specifying four discrete polarization directions, it maximizes the efficiency of determining the target synthetic polarization direction.

In some exemplary embodiments, steps S201 and S202 are executed periodically, meaning that the current attitude information of the UAV can be periodically obtained, and the target synthetic polarization direction can be determined based on the UAV's attitude information. This enables the remote control device to emit or receive electromagnetic waves with the target synthetic polarization direction with the antennas for the first and second polarization directions. Specific implementation details can be found in the corresponding description in FIG. 7. With this method, when the attitude of the UAV changes, the target synthetic polarization direction can be updated promptly. This is advantageous for the remote control device to more accurately receive data sent by the UAV. Additionally, it facilitates the reception of control commands sent by the remote control device to the UAV, thereby enhancing the communication quality between the remote control device and the UAV.

Figure 4:
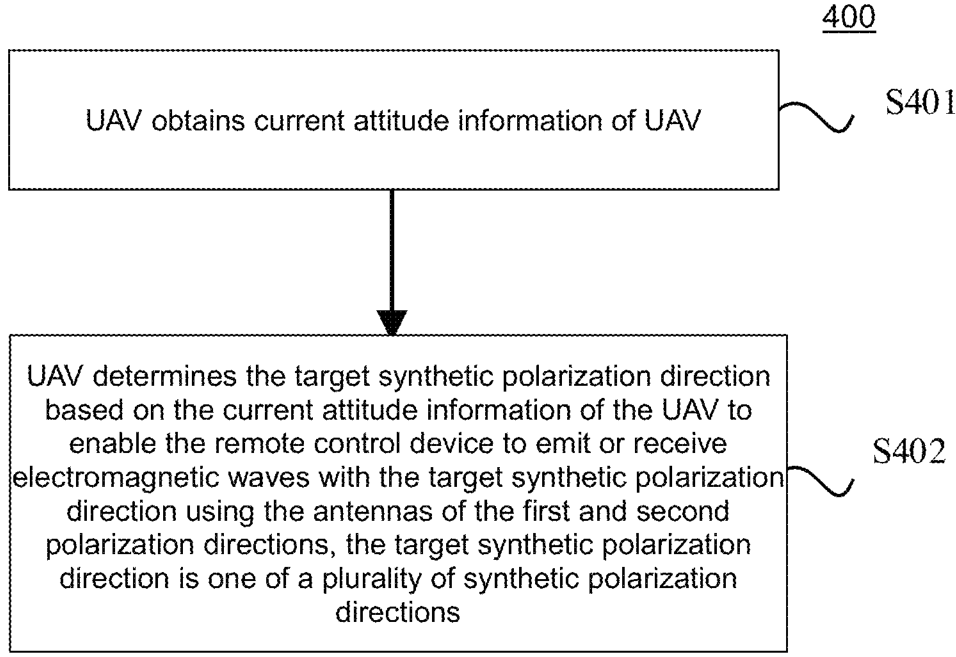
FIG. 4 illustrates a process 400 for polarization direction control according to some exemplary embodiments of the present disclosure.

With reference to FIG. 4, it illustrates a process 400 for polarization direction control according to some exemplary embodiments of the present disclosure; the method depicted in FIG. 4 can be executed by the UAV, specifically by at least one processor of the UAV. FIG. 4 includes steps S401 and S402.

S401: The UAV obtains the current attitude information of the UAV.

In some exemplary embodiments, the specific implementation of step S401 may involve the UAV determining its current attitude information with sensors. With this method, the UAV can determine the target synthetic polarization direction based on its current attitude information and then transmit this target synthetic polarization direction to the remote control device. The remote control device only needs to receive the target synthetic polarization direction sent by the UAV, enabling it to use the antennas of the first and second polarization directions to transmit or receive electromagnetic waves based on the target synthetic polarization direction. This method is advantageous as it reduces the computational load on the remote control device.

S402: The UAV determines the target synthetic polarization direction based on the current attitude information of the UAV. This is to enable the remote control device to emit or receive electromagnetic waves with the target synthetic polarization direction using the antennas of the first and second polarization directions. The target synthetic polarization direction is one of a plurality of synthetic polarization directions available.

In some exemplary embodiments, after determining the target synthetic polarization direction, the UAV transmits this target direction to the remote control device. Upon receiving the target synthetic polarization direction sent by the UAV, the remote control device uses the antennas of the first and second polarization directions to transmit or receive electromagnetic waves based on this target synthetic polarization direction. This method is advantageous for reducing the computational load on the remote control device.

Figure 5:
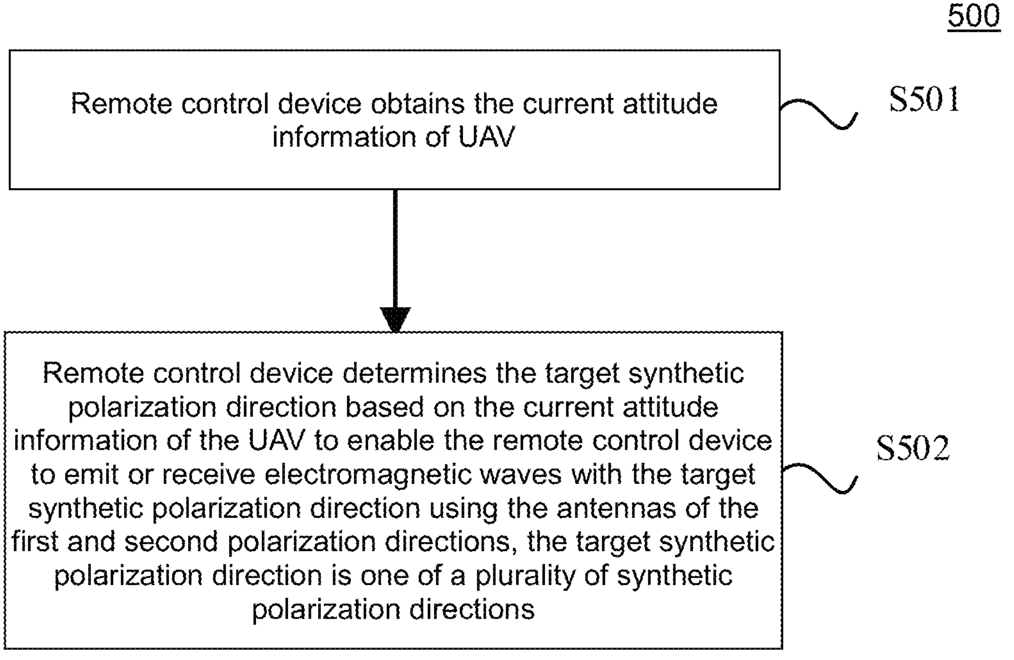
FIG. 5 illustrates a process 500 for polarization direction control according to some exemplary embodiments of the present disclosure.

With reference to FIG. 5, it illustrates a process 500 for polarization-direction control according to some exemplary embodiments of the present disclosure; the method depicted in FIG. 5 can be executed by the remote control device, specifically by at least one processor of the remote control device. FIG. 5 includes steps S501 and S502.

S501: The remote control device obtains the current attitude information of the UAV.

In some exemplary embodiments, the specific implementation of step S501 could be as follows: if the UAV's speed exceeds a predefined speed threshold, then the remote control device obtains the current attitude information of the UAV based on the amount of control lever displacement of the remote control device. Alternatively, if the UAV's speed is less than or equal to the predefined speed threshold, then the remote control device obtains the current attitude information of the UAV sent by the UAV itself. The current attitude information of the UAV is measured by the UAV's sensors. With this method, when the UAV is moving at a high speed, its attitude changes more rapidly. Therefore, the remote control device can more quickly determine the UAV's attitude information based on the amount of control lever displacement of the remote control device. Conversely, when the UAV is moving at a low speed, its attitude changes more slowly and the remote control device can obtain more accurate attitude information based on the attitude information sent by the UAV itself.

S502: The remote control device determines the target synthetic polarization direction based on the current attitude information of the UAV. This is to enable the remote control device to emit or receive electromagnetic waves with the target synthetic polarization direction using the antennas of the first and second polarization directions. The target synthetic polarization direction is one of a plurality of various synthetic polarization directions available.

In some exemplary embodiments, the remote control device is equipped with various polarization encodings for inputting signals of the antennas of the first and second polarization directions. Each polarization encoding corresponds to a specific synthetic polarization direction, organized according to a codebook. The codebook consists of multiple vectors arranged in a 2-row×N-column format, where N is an integer greater than or equal to 2. Each vector in a column of the codebook corresponds to one synthetic polarization direction. For example, if the current setup includes multiple polarization directions such as +45° linear polarization, −45° linear polarization, right-handed circular polarization, and left-handed circular polarization, and N equals 4, the specific codebook can be a 2×4 matrix:

$$\begin{bmatrix} 1 & 1 & 1 & 1 \\ 1 & -1 & e^{j\frac{\pi}{2}} & e^{-j\frac{\pi}{2}} \end{bmatrix}$$

The matrix indicates the amplitudes and phases corresponding to the first polarization direction and the second polarization direction. [1; 1] corresponds to +45° linear polarization; [1; −1] corresponds to −45° linear polarization;

$$\left[1; e^{j\frac{\pi}{2}}\right]$$

corresponds to right-handed circular polarization;

$$\left[1; e^{-j\frac{\pi}{2}}\right]$$

corresponds to left-handed circular polarization.

The implementation of the remote control device determining the target synthetic polarization direction can be as follows: the remote control device traverses vectors in each column in the codebook and selects an optimal column. When traversing the codebook, the remote control device divides the N column vectors into multiple groups, each group including at least two columns. First, it traverses the columns in each group and selects a relatively suitable column from each group. Then, it compares the relatively suitable columns from each group to select the optimal column. For example, taking the aforementioned 2×4 matrix as the codebook, [1; 1] and [1; −1] are made as the first group, and $$\left[1; e^{j\frac{\pi}{2}}\right] \text{ and } \left[1; e^{-j\frac{\pi}{2}}\right]$$

are made as the second group. After comparison, the relatively suitable column selected from the first group is [1; 1], and the relatively suitable column from the second group is $$\left[1; e^{j\frac{\pi}{2}}\right].$$

Then, [1; 1] and $$\left[1; e^{j\frac{\pi}{2}}\right]$$

are further compared, and the optimal column selected is [1; 1]. Finally, the remote control device transmits the data corresponding to the selected column matrix [1; 1] to the first polarization direction antenna and the second polarization direction antenna. The antennas in the first and second polarization directions then determine the target synthetic polarization direction as +45° linear polarization based on the acquired data, and transmit or receive +45° linear polarization electromagnetic waves.

Figure 6:
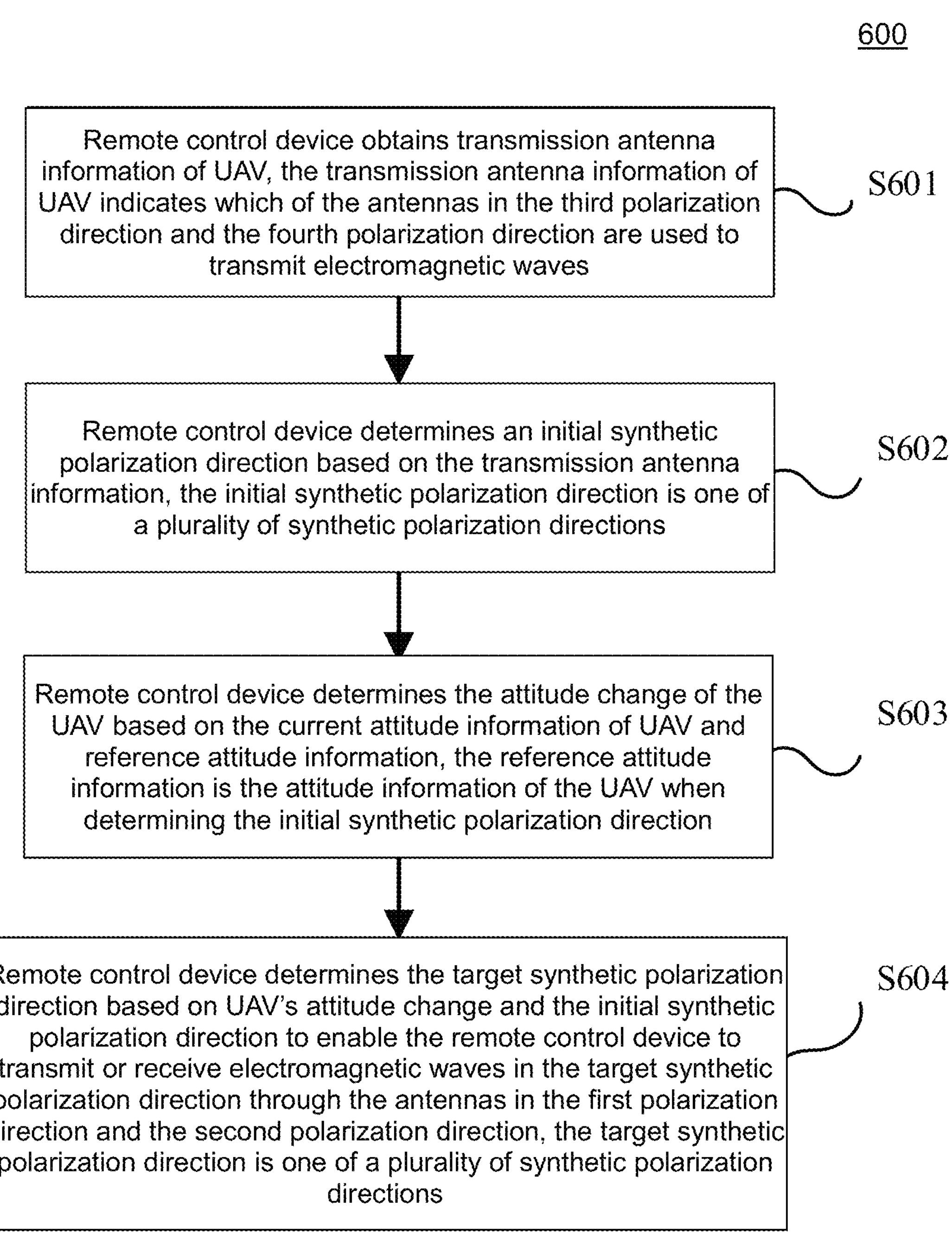
FIG. 6 illustrates a process 600 for polarization direction control according to some exemplary embodiments of the present disclosure.

With reference to FIG. 6, it illustrates a process 600 for polarization direction control according to some exemplary embodiments of the present disclosure, it mainly describes the control method of the remote control device receiving antenna polarization direction when the UAV is being powered on. The polarization direction control method shown in FIG. 6 can be applied to a remote control device, and executed by the remote control device, specifically by at least one processor of the remote control device. FIG. 6 includes steps S601 to S604, where steps S603 and S604 are the specific implementation of step S402.

S601: The remote control device obtains the transmission antenna information of the UAV. The transmission antenna information of the UAV indicates which of the antennas in the third polarization direction and the fourth polarization direction are used to transmit electromagnetic waves.

In the embodiment of the present disclosure, the UAV's rear arms are equipped with two antennas in the third polarization direction, and the UAV's front landing gear is equipped with two antennas in the fourth polarization direction. The antenna used for transmitting electromagnetic waves depends on the relative position of the UAV to the remote control device. For example, when the UAV is flying towards the remote control device, the head of the UAV faces the remote control device. At this time, the UAV can use the two antennas in the fourth polarization direction, located on the front landing gear, to send electromagnetic waves to the remote control device. Conversely, when the UAV is flying away from the remote control device, with its tail facing the remote control device, the UAV can use the antennas in the third polarization direction, located on the rear arms, to send electromagnetic waves to the remote control device. The remote control device is equipped with antennas in the first and second polarization directions. These antennas can transmit or receive electromagnetic waves with various synthetic polarization directions. The antenna in the first polarization direction and the antenna in the third polarization direction are horizontal polarization antennas, while the antenna in the second polarization direction and the antenna in the fourth polarization direction are vertical polarization antennas. The various polarization directions include +45° linear polarization, −45° linear polarization, right-hand circular polarization, and left-hand circular polarization.

S602: The remote control device determines an initial synthetic polarization direction based on the transmission antenna information. The initial synthetic polarization direction is one of a plurality of different synthetic polarization directions.

In some exemplary embodiments, the initial synthetic polarization direction can be a synthetic polarization direction determined by the remote control device based on the UAV's transmission antenna information when the UAV is being powered on. Before the remote control device obtains the UAV's attitude information to determine the target synthetic polarization direction, the UAV may transmit or receive electromagnetic waves in the initial synthetic polarization direction using the antennas in the first polarization direction and the second polarization direction according to the initial synthetic polarization direction.

In some exemplary embodiments, the remote control device determines the initial synthetic polarization direction based on the transmission antenna information. The specific implementation can be as follows: if the transmission antenna information indicates that the antenna used for transmitting electromagnetic waves is either the antenna in the third polarization direction or the antenna in the fourth polarization direction, the remote control device determines the initial synthetic polarization direction from +45° linear polarization and −45° linear polarization. If the transmission antenna information indicates that the antennas used for transmitting electromagnetic waves are both the antenna in the third polarization direction and the antenna in the fourth polarization direction, the remote control device determines the initial synthetic polarization direction from left-hand circular polarization and right-hand circular polarization. For example, if the UAV's transmission antennas are two horizontal polarization antennas, the synthetic polarization direction of the electromagnetic waves transmitted by the UAV can be in the horizontal polarization direction. In this case, selecting the initial synthetic polarization direction from +45° linear polarization and −45° linear polarization ensures that the remote control device can at least receive part of the electromagnetic waves. Therefore, this method can improve the communication quality between the UAV and the remote control device.

In some exemplary embodiments, the remote control device determines the initial synthetic polarization direction from +45° linear polarization and −45° linear polarization as follows: the remote control device obtains a first channel parameter corresponding to the signal received through +45° linear polarization and a second channel parameter corresponding to the signal received through −45° linear polarization. The first and second channel parameters indicate the signal quality received by the remote control device in the corresponding linear polarization direction. Based on the first and second channel parameters, the remote control device determines the linear polarization direction with the best signal quality from +45° linear polarization and −45° linear polarization as the initial synthetic polarization direction. The channel parameter can be a signal-to-noise ratio (SNR). The first channel parameter may refer to the SNR of the signal received by the remote control device through +45° linear polarization, and the second channel parameter may refer to the SNR of the signal received by the remote control device through −45° linear polarization. It can be understood that by comparing the first and second channel parameters, the remote control device can select the linear polarization direction with the best signal quality from +45° linear polarization and −45° linear polarization as the initial synthetic polarization direction. This selection process helps to improve the communication quality between the UAV and the remote control device.

In some exemplary embodiments, the remote control device determines the initial synthetic polarization direction from left-hand circular polarization and right-hand circular polarization as follows: the remote control device obtains a third channel parameter corresponding to the signal received through left-hand circular polarization and a fourth channel parameter corresponding to the signal received through right-hand circular polarization. The third and fourth channel parameters indicate the signal quality received by the remote control device in the corresponding circular polarization direction. Based on the third and fourth channel parameters, the remote control device determines the circular polarization direction with the best signal quality from left-hand circular polarization and right-hand circular polarization as the initial synthetic polarization direction. The channel parameter may be the signal-to-noise ratio (SNR). The third channel parameter may refer to the SNR of the signal received by the remote control device through left-hand circular polarization, and the fourth channel parameter may refer to the SNR of the signal received by the remote control device through right-hand circular polarization. It can be understood that by comparing the third and fourth channel parameters, the remote control device can select the circular polarization direction with the best signal quality from left-hand circular polarization and right-hand circular polarization as the initial synthetic polarization direction. This selection process helps to improve the communication quality between the UAV and the remote control device.

It should be noted that, in addition to SNR, the channel parameters can also be reference signal receiving power (RSRP) or reference signal receiving quality (RSRQ). In addition, the embodiments of the present disclosure are not limited to these parameters.

In some exemplary embodiments, the method also includes the following step: the remote control device determines the initial synthetic polarization direction based on the received antenna information, where the initial synthetic polarization direction is one of a plurality of different synthetic polarization directions. This method facilitates the remote control device in sending control commands that are more easily received by the UAV.

S603: The remote control device determines the attitude change of the UAV based on the current attitude information of the UAV and reference attitude information. The reference attitude information is the attitude information of the UAV when determining the initial synthetic polarization direction.

The attitude information herein includes yaw attitude information and/or roll attitude information, and the attitude change includes changes in yaw attitude and/or roll attitude. For instance, the attitude change can encompass the difference between the current yaw angle and the initial yaw angle of the UAV, as well as the difference between the current roll angle and the initial roll angle of the UAV. The reference attitude information is the attitude information of the UAV obtained when determining the initial synthetic polarization direction, i.e., the attitude information acquired when the UAV is being powered on.

S604: The remote control device determines the target synthetic polarization direction based on the UAV's attitude change and the initial synthetic polarization direction. This is done to enable the remote control device to transmit or receive electromagnetic waves in the target synthetic polarization direction through the antennas in the first polarization direction and the second polarization direction. The target synthetic polarization direction is one of various synthetic polarization directions.

In some exemplary embodiments, if the speed of the UAV is greater than a predetermined speed threshold, the specific implementation of step S604 could be as follows:

The remote control device determines whether the yaw attitude change exceeds a third preset angle threshold. If it does, it executes step S6041 and its corresponding subsequent step (either step S6042 or step S6043). If the remote control device determines that the UAV's yaw attitude change exceeds a second preset angle threshold but is less than or equal to the third preset angle threshold, it executes step S6044 and its corresponding subsequent step (either step S6045 or step S6046). If the remote control device determines that the UAV's yaw attitude change is less than or equal to the second preset angle threshold, it executes step S6047.

S6041: If the yaw attitude change exceeds the third preset angle threshold, the remote control device determines the initial synthetic polarization direction of the remote control device.

S6042: If the initial synthetic polarization direction of the remote control device is the first linear polarization direction, the remote control device determines the target synthetic polarization direction to be the second linear polarization direction.

S6043: If the initial synthetic polarization direction of the remote control device is the first circular polarization direction, the remote control device determines the target synthetic polarization direction to be the second circular polarization direction.

The first linear polarization direction is +45° linear polarization, and the second linear polarization direction is −45° linear polarization. The first linear polarization direction is −45° linear polarization, and the second linear polarization direction is +45° linear polarization. The first circular polarization direction is left-hand circular polarization, and the second circular polarization direction is right-hand circular polarization. The first circular polarization direction is right-hand circular polarization, and the second circular polarization direction is left-hand circular polarization.

S6044: If the yaw attitude change of the UAV exceeds the second preset angle threshold but is less than or equal to the third preset angle threshold, the remote control device determines the initial synthetic polarization direction of the remote control device.

The second preset angle threshold can be 45° or any other angle, such as 40°. The embodiments of the present disclosure are not limited to this value. The third preset angle threshold is greater than the second preset angle threshold. It can be 90° or any other angle, such as 80°. The embodiments of the present disclosure are not limited to this value.

S6045: If the initial synthetic polarization direction of the remote control device is a linear polarization direction, the remote control device determines the target synthetic polarization direction to be a circular polarization direction. This is done to enable the remote control device to transmit or receive electromagnetic waves in the target synthetic polarization direction through the antennas in the first polarization direction and the second polarization direction. The target synthetic polarization direction is one of various synthetic polarization directions.

In some exemplary embodiments, the remote control device determines the target synthetic polarization direction to be a circular polarization direction as follows: the remote control device obtains the third channel parameter corresponding to the signal received through left-hand circular polarization and the fourth channel parameter corresponding to the signal received through right-hand circular polarization. The third and fourth channel parameters indicate the signal quality received by the remote control device in the corresponding circular polarization direction. Based on the third and fourth channel parameters, the remote control device determines the circular polarization direction with the best signal quality from left-hand circular polarization and right-hand circular polarization as the target synthetic polarization direction. It can be understood that by comparing the third and fourth channel parameters, the remote control device can select the circular polarization direction with the best signal quality from left-hand circular polarization and right-hand circular polarization as the target synthetic polarization direction. This process helps to improve the communication quality between the UAV and the remote control device.

S6046: If the initial synthetic polarization direction of the remote control device is a circular polarization direction, the remote control device determines the target synthetic polarization direction to be a linear polarization direction.

S6047: If the yaw attitude change of the UAV is less than or equal to the second preset angle threshold, the remote control device determines the target synthetic polarization direction to be the initial synthetic polarization direction.

In some exemplary embodiments, the remote control device determines the target synthetic polarization direction to be a linear polarization direction as follows: the remote control device obtains the first channel parameter corresponding to the signal received through +45° linear polarization and the second channel parameter corresponding to the signal received through −45° linear polarization. The first and second channel parameters indicate the signal quality received by the remote control device in the corresponding linear polarization direction. Based on the first and second channel parameters, the remote control device determines the linear polarization direction with the best signal quality from +45° linear polarization and −45° linear polarization as the target synthetic polarization direction. It can be understood that by comparing the first and second channel parameters, the remote control device can select the linear polarization direction with the best signal quality from +45° linear polarization and −45° linear polarization as the target synthetic polarization direction. This approach helps to improve the communication quality between the UAV and the remote control device.

In some exemplary embodiments, if the speed of the UAV is less than or equal to the preset speed threshold, the method includes the following: if the yaw attitude change of the UAV exceeds the second preset angle threshold, obtain the transmission antenna information of the UAV; based on the transmission antenna information, determine the target synthetic polarization direction, where the target synthetic polarization direction is one of various synthetic polarization directions; if the yaw attitude change of the UAV is less than or equal to the second preset angle threshold, the remote control device determines the target synthetic polarization direction to be the initial synthetic polarization direction.

In some exemplary embodiments, if the transmission antenna information indicates that the UAV selects two horizontal polarization antennas as the transmission antennas, then the remote control device determines the linear polarization direction with the best signal quality from +45° linear polarization and −45° linear polarization as the target synthetic polarization direction. If the transmission antenna information indicates that the UAV selects two vertical polarization antennas as the transmission antennas, the remote control device determines the linear polarization direction with the best signal quality from +45° linear polarization and −45° linear polarization as the target synthetic polarization direction. If the transmission antenna information indicates that the UAV selects one vertical polarization antenna and one horizontal polarization antenna as the transmission antennas, the remote control device determines the circular polarization direction with the best signal quality from left-hand circular polarization and right-hand circular polarization as the target synthetic polarization direction. This method helps to improve communication quality.

It should be noted that when the UAV flies at a high speed, it does not adjust the transmission antenna; when the UAV flies at a slow speed and its yaw attitude changes, the UAV can reselect the transmission antenna from two antennas in the third polarization direction and two antennas in the fourth polarization direction to optimize the communication quality with the remote control device. For example, when the UAV is flying towards the remote control device with its head facing it, the UAV can send information to the remote control device with the two antennas set on the front landing gear in the fourth polarization direction. When the UAV flies away, with its tails facing the remote control device, the UAV can use the antennas in the third polarization direction set on the rear arm to send information to the remote control device. Based on this method, the communication quality between the UAV and the remote control device can be improved.

In some exemplary embodiments, the specific implementation of step S604 may be as follows: if the roll attitude change of the UAV exceeds the first preset angle threshold, and the initial synthetic polarization direction of the remote control device is the first linear polarization direction, then the target synthetic polarization direction is determined to be the second linear polarization direction. In this case, first linear polarization direction is +45° linear polarization, and the second linear polarization direction is −45° linear polarization; when the first linear polarization direction is −45° linear polarization, the second linear polarization direction is +45° linear polarization. If the roll attitude change of the UAV is less than or equal to the first preset angle threshold, the remote control device determines the target synthetic polarization direction to be the initial synthetic polarization direction. The first preset angle threshold can be 90°, or other angles such as 80°; the embodiments of the present disclosure do not limit this. Based on this method, it is possible to greatly avoid polarization mismatch caused by attitude changes during UAV flight, thus improving the communication quality between the UAV and the remote control device.

Figure 7:
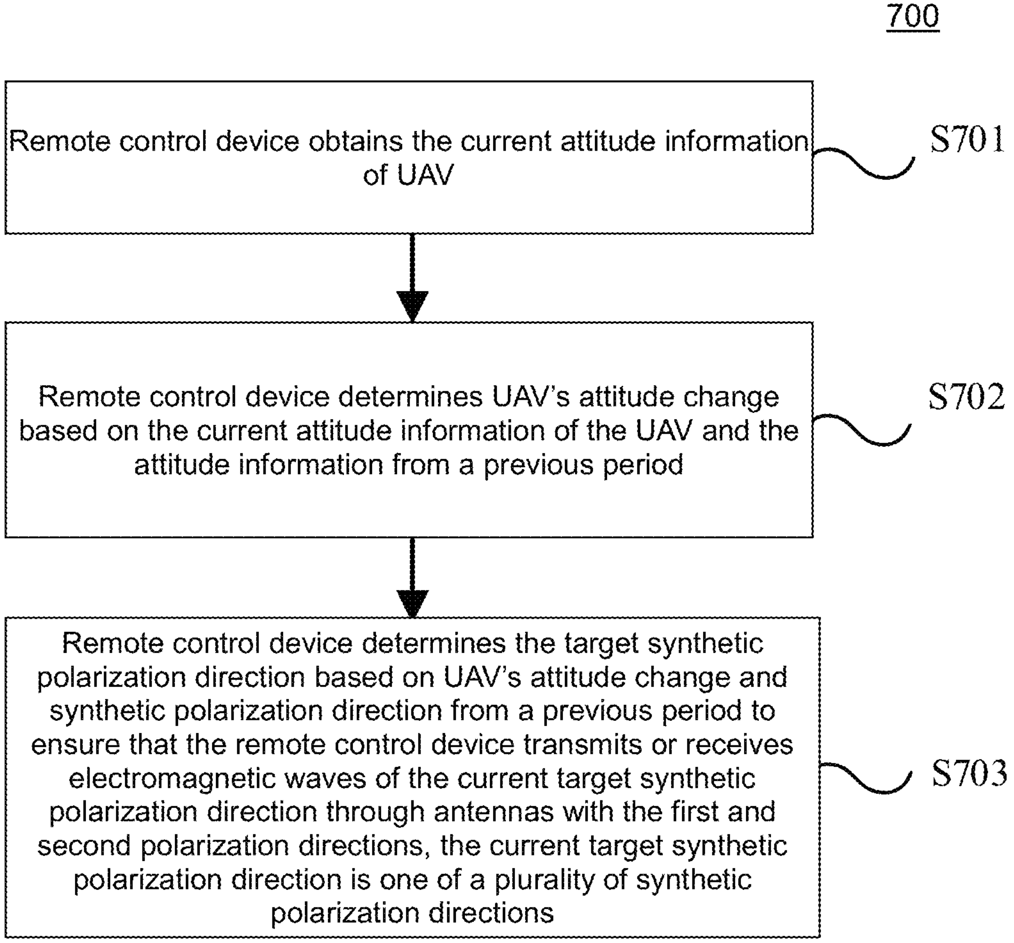
FIG. 7 illustrates a process 700 for polarization direction control according to some exemplary embodiments of the present disclosure.

With reference to FIG. 7, it illustrates a process 700 for polarization direction control according to some exemplary embodiments of the present disclosure; it mainly describes the method for controlling the antenna polarization direction received by the remote control device after the UAV has flown for a period of time. The method of controlling the polarization direction shown in FIG. 7 can be applied to the remote control device. The UAV and the remote control device establish a communication connection, and they can transmit signals to each other based on the communication connection. The method of controlling the polarization direction described in FIG. 7 can be executed by the remote control device, specifically by at least one processor of the remote control device. FIG. 7 includes steps S701 to S703, where steps S7012 and S703 are specific implementations of step S202, and steps S701 and S201 have the same implementation method. The embodiments of the present disclosure do not elaborate on this herein.

S701: The remote control device obtains the current attitude information of the UAV.

The remote control device can periodically acquire the current attitude information of the UAV and determine the target synthetic polarization direction based on the UAV's attitude information. This ensures that the remote control device transmits or receives electromagnetic waves of the target synthetic polarization direction through antennas with the first and second polarization directions. In this case, when the attitude of the UAV changes, the target synthetic polarization direction can be updated promptly. This is advantageous for the remote control device to receive data from the UAV more accurately. At the same time, it also facilitates the UAV in receiving control commands sent by the remote control device more easily, thereby improving the communication quality between the remote control device and the UAV.

S702: The remote control device determines the UAV's attitude change based on the current attitude information of the UAV and the attitude information from a previous period.

The attitude information includes yaw attitude information and/or roll attitude information, and the attitude change includes yaw attitude change and/or roll attitude change. For example, the attitude change can be the difference between the current yaw angle of the UAV and the yaw angle from the previous period, as well as the difference between the current roll angle of the UAV and the roll angle from the previous period. In this case, after the UAV has flown for a period of time, the remote control device periodically obtains the attitude information of the UAV and determines if there has been a change in attitude. This allows the remote control device to determine the current attitude information of the UAV in real-time. When the attitude of the UAV changes, the target synthetic polarization direction can be updated promptly. This is beneficial for the remote control device to receive data from the UAV more accurately and to facilitate the UAV in receiving control commands sent by the remote control device more easily, thereby improving the communication quality between the remote control device and the UAV.

S703: The remote control device determines the target synthetic polarization direction based on the UAV's attitude change and the synthetic polarization direction from a previous period. This is done to ensure that the remote control device transmits or receives electromagnetic waves of the current target synthetic polarization direction through antennas with the first and second polarization directions. The current target synthetic polarization direction is one of a plurality of different synthetic polarization directions.

In some exemplary embodiments, the specific implementation of step S703 may be as follows: if the roll attitude change of the UAV exceeds the first preset angle threshold, and the synthetic polarization direction on the remote control device from the previous period is the first linear polarization direction, then the target synthetic polarization direction is determined to be the second linear polarization direction. In this case, the first linear polarization direction is +45° linear polarization, and the second linear polarization direction is −45° linear polarization; when the first linear polarization direction is −45° linear polarization, the second linear polarization direction is +45° linear polarization. If the roll attitude change of the UAV is less than or equal to the first preset angle threshold, the remote control device determines the current target synthetic polarization direction to be the target synthetic polarization direction from the previous period. Based on this method, the communication quality between the UAV and the remote control device can be improved.

In some exemplary embodiments, if the speed of the UAV is greater than the preset speed threshold, the specific implementation of step S703 can be as follows:

The remote control device determines that the yaw attitude change of the UAV exceeds the third preset angle threshold, and then executes step S7031 and its corresponding subsequent steps (either step S7032 or step S7033). If the remote control device determines that the yaw attitude change of the UAV exceeds the second preset angle threshold but is less than or equal to the third preset angle threshold, it then executes step S7034 and its corresponding subsequent steps (either step S7035 or step S7036). If the remote control device determines that the yaw attitude change of the UAV is less than or equal to the second preset angle threshold, it then executes step S7037.

7031: If the yaw attitude change exceeds the third preset angle threshold, the remote control device determines the target synthetic polarization direction from a previous period.

S7032: If the target synthetic polarization direction from the previous period of the remote control device is the first linear polarization direction, the remote control device determines the target synthetic polarization direction to be the second linear polarization direction.

S7033: If the target synthetic polarization direction from the previous period of the remote control device is the first circular polarization direction, the remote control device determines the target synthetic polarization direction to be the second circular polarization direction.

When the first linear polarization direction is +45° linear polarization, the second linear polarization direction is −45° linear polarization. When the first linear polarization direction is −45° linear polarization, the second linear polarization direction is +45° linear polarization. When the first circular polarization direction is left-handed circular polarization, the second circular polarization direction is right-handed circular polarization. When the first circular polarization direction is right-handed circular polarization, the second circular polarization direction is left-handed circular polarization. This method can enhance the communication quality between the UAV and the remote control device.

S7034: If the yaw attitude change of the UAV exceeds the second preset angle threshold but is less than or equal to the third preset angle threshold, the remote control device determines the target synthetic polarization direction from a previous period.

S7035: If the target synthetic polarization direction from the previous period of the remote control device is a linear polarization direction, the remote control device determines the target synthetic polarization direction to be a circular polarization direction.

In some exemplary embodiments, the remote control device determines the target synthetic polarization direction to be a circular polarization direction through the following specific implementation: the remote control device obtains the third channel parameter corresponding to signal reception through left-handed circular polarization and the fourth channel parameter corresponding to signal reception through right-handed circular polarization. These parameters indicate the signal quality received by the remote control device through each circular polarization direction. Based on the third and fourth channel parameters, the remote control device determines the circular polarization direction that provides the optimal signal quality, either left-handed or right-handed circular polarization, as the target synthetic polarization direction. By comparing the third and fourth channel parameters and selecting the circular polarization direction with the best signal quality from left-handed and right-handed circular polarization, the remote control device can select the target synthetic polarization direction from the previous period. This helps enhance the communication quality between the UAV and the remote control device.

S7036: If the target synthetic polarization direction from the previous period of the remote control device is a circular polarization direction, the remote control device determines the target synthetic polarization direction to be a linear polarization direction. This method can enhance the communication quality between the UAV and the remote control device.

In some exemplary embodiments, the remote control device determines the target synthetic polarization direction to be a linear polarization direction through the following specific implementation: the remote control device obtains the first channel parameter corresponding to signal reception through +45° linear polarization and the second channel parameters corresponding to signal reception through −45° linear polarization. These parameters indicate the signal quality received by the remote control device through each linear polarization direction. Based on the first and second channel parameters, the remote control device determines the linear polarization direction that provides the optimal signal quality, either +45° or −45° linear polarization, as the target synthetic polarization direction. By comparing the first and second channel parameters and selecting the linear polarization direction with the best signal quality from +45° and −45° linear polarization, the remote control device can select the target synthetic polarization direction of the previous period. This helps enhance the communication quality between the UAV and the remote control device.

S7037: If the yaw attitude change of the UAV is less than or equal to the second preset angle threshold, the remote control device determines the current target synthetic polarization direction to be the target synthetic polarization direction of the previous period.

In some exemplary embodiments, if the speed of the UAV is less than or equal to a preset speed threshold, the method also includes the following: if the yaw attitude change of the UAV exceeds the second preset angle threshold, the remote control device obtains the transmission antenna information of the UAV. Based on the transmission antenna information, the remote control device determines the target synthetic polarization direction. The target synthetic polarization direction is one of a plurality of different synthetic polarization directions. If the yaw attitude change of the UAV is less than or equal to the second preset angle threshold, the remote control device determines the current target synthetic polarization direction of the previous period to be the target synthetic polarization direction. This method aims to enhance the communication quality between the UAV and the remote control device.

The specific implementation of step S703 is similar to step S604, reference can be made to the description for step S604 for details; this is not repeated herein.

Figure 8:
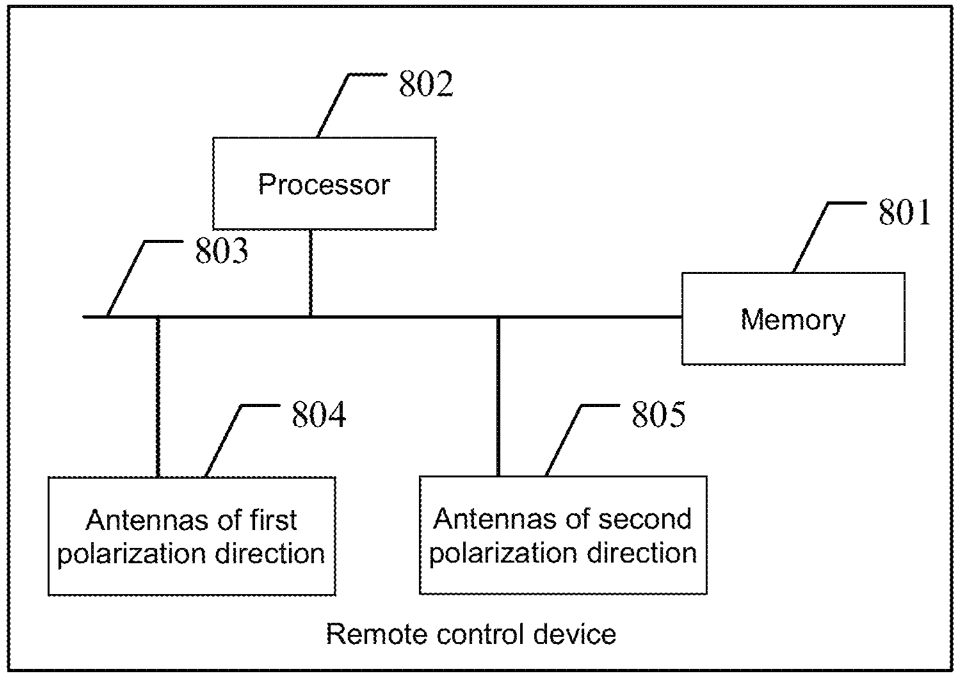
FIG. 8 is a schematic diagram of the structure of a remote control device according to some exemplary embodiments of the present disclosure.

Based on the above-described exemplary embodiments, the present disclosure also provides a remote control device, as shown in FIG. 8. FIG. 8 illustrates a schematic diagram of the structure of a remote control device provided according to some exemplary embodiments of the present disclosure. The remote control device shown in FIG. 8 may include at least a memory/storage device 801, at least a processor 802, a first polarization direction antenna 804, and a second polarization direction antenna 805. Any two of the memory/storage device 801, the processor 802, the first polarization direction antenna 804, and the second polarization direction antenna 805 may be connected via a bus 803. The first polarization direction antenna and the second polarization direction antenna are capable of transmitting or receiving electromagnetic waves of various synthetic polarization directions. The memory/storage device 801 is used to store program code. The processor 802 calls the program code in the memory/storage device 801. When the program code is executed, the processor 802 performs the following operations: obtaining the current attitude information of the UAV; determining the target synthetic polarization direction based on the current attitude information of the UAV, so that the remote control device can transmit or receive electromagnetic waves of the target synthetic polarization direction with the first polarization direction antenna and the second polarization direction antenna. The target synthetic polarization direction is one of a plurality of different synthetic polarization directions. The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

When the processor 802 obtains the current attitude information of the UAV, it performs the following operations: if the speed of the UAV is greater than a preset speed threshold, it obtains the current attitude information of the UAV based on the amount of control lever displacement of the remote control device; or if the speed of the UAV is less than or equal to the preset speed threshold, it obtains the current attitude information of the UAV sent by the UAV, where the current attitude information of the UAV is measured by the UAV's sensors.

In some exemplary embodiments, when the processor 802 obtains the current attitude information of the UAV, it performs the following operations: if the speed of the UAV is greater than the preset speed threshold, it obtains the current attitude information of the UAV based on the amount of control lever displacement of the remote control device; or, if the speed of the UAV is less than or equal to the preset speed threshold, it obtains the current attitude information of the UAV sent by the UAV, where the current attitude information of the UAV is measured by the UAV's sensors.

In some exemplary embodiments, the UAV is equipped with antennas of a third polarization direction and antennas of a fourth polarization direction, where the third polarization direction is different from the fourth polarization direction. Before determining the target synthetic polarization direction based on the current attitude information of the UAV, the processor 802 also performs the following operations: obtaining the transmission antenna information of the UAV, where the transmission antenna information is used to indicate which antennas from the antennas of the third polarization direction and the antennas of the fourth polarization direction are used for transmitting electromagnetic waves; determining an initial synthetic polarization direction based on the transmission antenna information, where the initial synthetic polarization direction is one of a plurality of different synthetic polarization directions.

In some exemplary embodiments, the antennas of the first polarization direction and the antennas of the third polarization direction are horizontal polarization antennas, the antennas of the second polarization direction and the antennas of the fourth polarization direction are vertical polarization antennas, and the plurality of different polarization directions include +45° linear polarization, −45° linear polarization, right-hand circular polarization, and left-hand circular polarization.

In some exemplary embodiments, the UAV's rear arms are equipped with two antennas of the third polarization direction, and the UAV's front landing gear is equipped with two antennas of the fourth polarization direction. The antennas used for transmitting electromagnetic waves can be related to the relative position between the UAV and the remote control device.

In some exemplary embodiments, when the processor 802 determines the initial synthetic polarization direction based on the transmission antenna information, it performs the following operations: if the transmission antenna information indicates that the antennas used for transmitting electromagnetic waves are the antennas of the third polarization direction or the antennas of the fourth polarization direction, it determines the initial synthetic polarization direction from +45° linear polarization and −45° linear polarization; if the transmission antenna information indicates that the antennas used for transmitting electromagnetic waves are the antennas of the third polarization direction and the antennas of the fourth polarization direction, it determines the initial synthetic polarization direction from left-hand circular polarization and right-hand circular polarization.

In some exemplary embodiments, when the processor 802 determines the initial synthetic polarization direction from +45° linear polarization and −45° linear polarization, it performs the following steps: obtaining a first channel parameter corresponding to the remote control device receiving signals through +45° linear polarization and a second channel parameter corresponding to the remote control device receiving signals through −45° linear polarization, where the first channel parameter and the second channel parameter are used to indicate the signal quality of the remote control device receiving signals through the corresponding linear polarization direction; determining the linear polarization direction with the optimal signal quality as the initial synthetic polarization direction from +45° linear polarization and −45° linear polarization based on the first channel parameter and the second channel parameter. When the processor 802 determines the initial synthetic polarization direction from left-hand circular polarization and right-hand circular polarization, it performs the following steps: obtaining a third channel parameter corresponding to the remote control device receiving signals through left-hand circular polarization and a fourth channel parameter corresponding to the remote control device receiving signals through right-hand circular polarization, where the third channel parameter and the fourth channel parameter are used to indicate the signal quality of the remote control device receiving signals through the corresponding circular polarization direction; determining the circular polarization direction with the optimal signal quality as the initial synthetic polarization direction from left-hand circular polarization and right-hand circular polarization based on the third channel parameter and the fourth channel parameter.

In some exemplary embodiments, when the processor 802 determines the target synthetic polarization direction based on the current attitude information of the UAV, it performs the following operation: determining the attitude change of the UAV based on the current attitude information of the UAV and reference attitude information, where the reference attitude information is the attitude information of the UAV when determining the initial synthetic polarization direction; determining the target synthetic polarization direction based on the attitude change of the UAV and the initial synthetic polarization direction.

In some exemplary embodiments, the attitude change includes a yaw attitude change and/or a roll attitude change.

In some exemplary embodiments, when the processor 802 determines the target synthetic polarization direction based on the attitude change of the UAV and the initial synthetic polarization direction, it performs the following operation: if the roll attitude change of the UAV exceeds a first preset angle threshold, and the initial synthetic polarization direction of the remote control device is the first linear polarization direction, it determines the target synthetic polarization direction as the second linear polarization direction.

In some exemplary embodiments, when the speed of the UAV is greater than a preset speed threshold, the processor 802 performs the following operation when determining the target synthetic polarization direction based on the attitude change amount of the UAV and the initial synthetic polarization direction: if the yaw attitude change of the UAV exceeds a second preset angle threshold, but is less than or equal to a third preset angle threshold, it determines the initial synthetic polarization direction of the remote control device; if the initial synthetic polarization direction of the remote control device is a linear polarization direction, it determines the target synthetic polarization direction as a circular polarization direction; If the initial synthetic polarization direction of the remote control device is a circular polarization direction, it determines the target synthetic polarization direction as a linear polarization direction.

In some exemplary embodiments, when the processor 802 determines the target synthetic polarization direction as a circular polarization direction, it performs the following operations: obtaining a third channel parameter corresponding to the remote control device receiving signals through left-hand circular polarization and a fourth channel parameter corresponding to the remote control device receiving signals through right-hand circular polarization, where the third channel parameter and the fourth channel parameter are used to indicate the signal quality of the remote control device receiving signals through the corresponding circular polarization direction; determining the circular polarization direction with the optimal signal quality as the target synthetic polarization direction from left-hand circular polarization and right-hand circular polarization based on the third channel parameter and the fourth channel parameter. When the processor 802 determines the target synthetic polarization direction as a linear polarization direction, it performs the following operations: obtaining a first channel parameter corresponding to the remote control device receiving signals through +45° linear polarization and a second channel parameter corresponding to the remote control device receiving signals through −45° linear polarization, where the first channel parameter and the second channel parameter are used to indicate the signal quality of the remote control device receiving signals through the corresponding linear polarization direction; determining the linear polarization direction with the optimal signal quality as the target synthetic polarization direction from +45° linear polarization and −45° linear polarization based on the first channel parameter and the second channel parameter.

In some exemplary embodiments, when the speed of the UAV is greater than the preset speed threshold, the processor 802 performs the following operation when determining the target synthetic polarization direction based on the attitude change of the UAV and the initial synthetic polarization direction: if the yaw attitude change exceeds a third preset angle threshold, it determines the initial synthetic polarization direction of the remote control device; if the initial synthetic polarization direction of the remote control device is a first linear polarization direction, it determines the target synthetic polarization direction as a second linear polarization direction; if the initial synthetic polarization direction of the remote control device is a first circular polarization direction, it determines the target synthetic polarization direction as a second circular polarization direction.

Based on the above exemplary embodiments, since the UAV's attitude changes during flight, the angle of the antenna on the UAV may also change. Therefore, when the remote control device determines the target synthetic polarization direction based on the UAV's current attitude information, it ensures that the target synthetic polarization direction matches the current angle of the UAV's antenna. As a result, when the remote control device transmits or receives electromagnetic waves in the target synthetic polarization direction through antennas in the first and second polarization directions, it can largely avoid polarization mismatch. This makes it easier to receive signals sent from the UAV and also makes the control instructions sent by the remote control device more easily received by the UAV, thereby improving the communication quality between the remote control device and the UAV.

The present disclosure also provides a computer storage medium, which is a memory/storage device within an information processing device used for storing programs and data. It is understood that the computer storage medium mentioned herein can include both built-in storage media within the information processing device and extended storage media supported by the information processing device. The computer storage medium provides storage space, which stores the operating system of the information processing device. Additionally, the storage space also holds one or more instructions suitable for being loaded and executed by the processor 802. These instructions can be one or more computer programs (including program code). It should be noted that the computer storage medium herein can be high-speed RAM memory or non-volatile memory, such as at least one disk storage device; alternatively, it can also be at least one computer storage medium located remotely from the aforementioned processor.

The above disclosures are merely part of the embodiments of the present disclosure and should not be used to limit the scope of the present disclosure. Therefore, equivalent changes made according to the claims of the present disclosure are still within the scope covered by the present disclosure.

What is claimed is:

1. A method, comprising:

obtaining, by a remote control device, first transmission antenna information of a first antenna of a movable platform, wherein the first transmission antenna information comprises a polarization direction of the first antenna to transmit electromagnetic waves;

determining, by the remote control device, an initial synthetic polarization direction of a second antenna of the remote control device based at least in part on the first transmission antenna information and an initial attitude of the movable platform;

obtaining, by the remote control device, current attitude data indicative of an attitude change of the movable platform compared to the initial attitude;

determining, by the remote control device, a target synthetic polarization direction of the second antenna based at least in part on the current attitude data and the initial synthetic polarization direction: and, controlling, by the remote control device, the second antenna to receive and/or transmit the electromagnetic waves with the target synthetic polarization direction.

2. The method according to claim 1, wherein the current attitude data is determined based at least in part on current attitude information of the movable platform and initial attitude information;

the initial attitude information is attitude information of the movable platform when determining the initial synthetic polarization direction, and the current attitude information is obtained based on at least one of the following:

obtaining the current attitude information of the movable platform based at least in part on an amount of control lever displacement of the remote control device in response to a speed of the movable platform being greater than a preset speed threshold, or obtaining the current attitude information of the movable platform sent by the movable platform in response to the speed of the movable platform being less than or equal to the preset speed threshold, wherein the current attitude information of the movable platform is measured by a sensor of the movable platform.

3. The method according to claim 1, wherein the current attitude data is obtained based at least in part on a speed of the movable platform.

4. The method according to claim 1, wherein the second antenna comprises at least one second antenna of a first polarization direction and at least one second antenna of a second polarization direction; and the target synthetic polarization direction is achieved by the at least one second antenna of the first polarization direction and the at least one second antenna of the second polarization direction; or the movable platform is further provided with at least one first antenna of a third polarization direction and at least one first antenna of a fourth polarization direction, and the first transmission antenna information is configured to indicate the at least one first antenna of the third polarization direction and the at least one first antenna of the fourth polarization direction for transmitting the electromagnetic waves.

5. The method according to claim 4, wherein the at least one second antenna of the first polarization direction and the at least one first antenna of the third polarization direction are horizontal polarization antennas, the at least one second antenna of the second polarization direction and the at least one first antenna of the fourth polarization direction are vertical polarization antennas;

each of the initial synthetic polarization direction and the target synthetic polarization direction is one of a plurality of synthetic polarization directions, and the plurality of synthetic polarization directions includes comprises at least one of +45° linear polarization, −45° linear polarization, right-hand circular polarization or left-hand circular polarization.

6. The method according to claim 5, wherein the determining of the initial synthetic polarization direction based at least in part on the first transmission antenna information comprises:

determining the initial synthetic polarization direction between the +45° linear polarization and the −45° linear polarization when the first transmission antenna information indicates that antennas for transmitting the electromagnetic waves are the at least one first antenna of the third polarization direction or the at least one first antenna of the fourth polarization direction; or determining the initial synthetic polarization direction between the left-hand circular polarization and the right-hand circular polarization when the first transmission antenna information indicates that antennas for transmitting the electromagnetic waves are the at least one first antenna of the third polarization direction and the at least one first antenna of the fourth polarization direction.

7. The method according to claim 6, wherein the determining of the initial synthetic polarization direction between the +45° linear polarization and the −45° linear polarization comprises:

obtaining a first channel parameter corresponding to the remote control device receiving signals via the +45° linear polarization and a second channel parameter corresponding to the remote control device receiving signals via the −45° linear polarization, wherein the first channel parameter and the second channel parameter indicate a signal quality of signals received by the remote control device, and determining, based at least in part on the first channel parameter and the second channel parameter, a linear polarization direction of a best signal quality between the +45° linear polarization and the −45° linear polarization as the initial synthetic polarization direction; and the determining of the initial synthetic polarization direction between the left-hand circular polarization and the right-hand circular polarization comprises:

obtaining a third channel parameter corresponding to the remote control device receiving signals via the left-hand circular polarization and a fourth channel parameter corresponding to the remote control device receiving signals via the right-hand circular polarization, wherein the third channel parameter and the fourth channel parameter indicate a signal quality of signals received by the remote control device, and determining, based at least in part on the third channel parameter and the fourth channel parameter, a circular polarization direction of a best signal quality between the left-hand circular polarization and the right-hand circular polarization as the initial synthetic polarization direction.

8. The method according to claim 1, wherein the attitude change comprises a roll attitude change; and the determining of the target synthetic polarization direction comprises:

determining that the target synthetic polarization direction is the initial synthetic polarization direction in response to the roll attitude change of the movable platform not exceeding a first preset angle threshold, or determining that the target synthetic polarization direction is a second linear polarization direction in response to the roll attitude change of the movable platform exceeding the first preset angle threshold and the initial synthetic polarization direction being a first linear polarization direction.

9. The method according to claim 1, wherein the attitude change comprises a yaw attitude change; and the determining of the target synthetic polarization direction comprises:

determining that the target synthetic polarization direction is the initial synthetic polarization direction in response to the yaw attitude change of the movable platform not exceeding a second preset angle threshold, or determining in response to the yaw attitude change of the movable platform exceeding the second preset angle threshold and being less than or equal to a third preset angle threshold, the target synthetic polarization direction based at least in part on any of the following scenarios:

Scenario I: determining that the target synthetic polarization direction is a circular polarization direction in response to the initial synthetic polarization direction being a linear polarization direction, Scenario II: determining that the target synthetic polarization direction is a linear polarization in response to the initial synthetic polarization direction being a circular polarization, or determining, in response to the yaw attitude change of the movable platform exceeding the third preset angle threshold, the target synthetic polarization direction based at least in part on any of the following scenarios:

Scenario III: determining that the target synthetic polarization direction is a second linear polarization direction in response to the initial synthetic polarization direction being a first linear polarization direction, Scenario IV: determining that the target synthetic polarization direction is a second circular polarization direction in response to the initial synthetic polarization direction being a first circular polarization direction.

10. The method according to claim 9, wherein the determining that the target synthetic polarization direction is a circular polarization direction comprises:

obtaining a third channel parameter corresponding to the remote control device receiving signals via the left-hand circular polarization and a fourth channel parameter corresponding to the remote control device receiving signals via the right-hand circular polarization, wherein the third channel parameter and the fourth channel parameter indicate a signal quality of signals received by the remote control device, and determining, based at least in part on the third channel parameter and the fourth channel parameter, a circular polarization direction of a best signal quality between the left-hand circular polarization and the right-hand circular polarization as the target synthetic polarization direction; and the determining that the target synthetic polarization direction is a linear polarization comprises:

obtaining a first channel parameter corresponding to the remote control device receiving signals via the +45° linear polarization and a second channel parameter corresponding to the remote control device receiving signals via the −45° linear polarization, wherein the first channel parameter and the second channel parameter indicate a signal quality of signals received by the remote control device, and determining, based at least in part on the first channel parameter and the second channel parameter, a linear polarization direction of a best signal quality between the +45° linear polarization and the −45° linear polarization as the target synthetic polarization direction.

11. A remote control device, comprising:

at least one non-transitory storage medium storing at least one set of instructions; and at least one processor in communication with the at least one non-transitory storage medium, wherein during operation, the at least one processor executes the at least one set of instructions to cause the remote control device to at least:

obtain first transmission antenna information of a first antenna of a movable platform, wherein the first transmission antenna information comprises a polarization direction of the first antenna to transmit electromagnetic waves;

determine an initial synthetic polarization direction of a second antenna of the remote control device based at least in part on the first transmission antenna information and an initial attitude of the movable platform;

obtain current attitude data indicative of an attitude change of the movable platform compared to the initial attitude;

determine a target synthetic polarization direction of the second antenna based at least in part on the current attitude data and the initial synthetic polarization direction; and control the second antenna to receive and/or transmit the electromagnetic waves with the target synthetic polarization direction.

12. The remote control device according to claim 11, wherein the current attitude data is determined based at least in part on current attitude information of the movable platform and initial attitude information;

the initial attitude information is attitude information of the movable platform when determining the initial synthetic polarization direction, and the current attitude information is obtained based on at least one of the following:

obtaining the current attitude information of the movable platform based at least in part on an amount of control lever displacement of the remote control device, in response to a speed of the movable platform being greater than a preset speed threshold, or obtaining the current attitude information of the movable platform sent by the movable platform in response to the speed of the movable platform being less than or equal to the preset speed threshold, wherein the current attitude information is measured by a sensor of the movable platform.

13. The remote control device according to claim 11, wherein the current attitude data is obtained based at least in part on a speed of the movable platform.

14. The remote control device according to claim 11, wherein the second antenna comprises at least one second antenna of a first polarization direction and at least one second antenna of a second polarization direction; and the target synthetic polarization direction is achieved by the at least one second antenna of the first polarization direction and the at least one second antenna of second polarization direction; or the movable platform is further provided with at least one first antenna of a third polarization direction and at least one first antenna of a fourth polarization direction, and the first transmission antenna information is configured to indicate the at least one first antenna of the third polarization direction and the at least one first antenna of the fourth polarization direction for transmitting the electromagnetic waves.

15. The remote control device according to claim 14, wherein the at least one second antenna of the first polarization direction and the at least one first antenna of the third polarization direction are horizontal polarization antennas, the at least one second antenna of the second polarization direction and the at least one first antenna of the fourth polarization direction are vertical polarization antennas;

each of the initial synthetic polarization direction and the target synthetic polarization direction is one of a plurality of synthetic polarization directions, and the plurality of synthetic polarization directions comprises at least one of +45° linear polarization, −45° linear polarization, right-hand circular polarization or left-hand circular polarization.

16. The remote control device according to claim 15, wherein to determine the initial synthetic polarization direction based at least in part on the first transmission antenna information, the at least one processor executes the at least one set of instructions to cause the remote control device to at least:

determine the initial synthetic polarization direction between the +45° linear polarization and the −45° linear polarization when the first transmission antenna information indicates that antennas for transmitting the electromagnetic waves are the at least one first antenna of the third polarization direction or the at least one first antenna of the fourth polarization direction; or determine the initial synthetic polarization direction between the left-hand circular polarization and the right-hand circular polarization when the first transmission antenna information indicates that antennas for transmitting the electromagnetic waves are the at least one first antenna of the third polarization direction and the at least one first antenna of the fourth polarization direction.

17. The remote control device according to claim 16, wherein to determine the initial synthetic polarization direction between the +45° linear polarization and the −45° linear polarization, the at least one processor executes the at least one set of instructions to cause the remote control device to at least:

obtain a first channel parameter corresponding to the remote control device receiving signals via the +45° linear polarization and a second channel parameter corresponding to the remote control device receiving signals via the −45° linear polarization, wherein the first channel parameter and the second channel parameter indicate a signal quality of signals received by the remote control device, and determine, based at least in part on the first channel parameter and the second channel parameter, a linear polarization direction of a best signal quality between the +45° linear polarization and the −45° linear polarization as the initial synthetic polarization direction; and to determine the initial synthetic polarization direction between the left-hand circular polarization and the right-hand circular polarization, the at least one processor executes the at least one set of instructions to cause the remote control device to at least:

obtain a third channel parameter corresponding to the remote control device receiving signals via the left-hand circular polarization and a fourth channel parameter corresponding to the remote control device receiving signals via the right-hand circular polarization, wherein the third channel parameter and the fourth channel parameter indicate a signal quality of signals received by the remote control device, and determine, based at least in part on the third channel parameter and the fourth channel parameter, a circular polarization direction of a best signal quality between the left-hand circular polarization and the right-hand circular polarization as the initial synthetic polarization direction.

18. The remote control device according to claim 11, wherein the attitude change comprises a roll attitude change; and to determine the target synthetic polarization direction based at least in part on the attitude change of the movable platform and the initial synthetic polarization direction, the at least one processor executes the at least one set of instructions to cause the remote control device to at least:

determine that the target synthetic polarization direction is the initial synthetic polarization direction in response to the roll attitude change of the movable platform does not exceed not exceeding a first preset angle threshold, or determine that the target synthetic polarization direction is a second linear polarization direction in response to the roll attitude change of the movable platform exceeding the first preset angle threshold and the initial synthetic polarization direction being a first linear polarization direction.

19. The remote control device according to claim 11, wherein the attitude change comprises a yaw attitude change; and to determine the target synthetic polarization direction based at least in part on the attitude change of the movable platform and the initial synthetic polarization direction, the at least one processor executes the at least one set of instructions to cause the remote control device to at least:

determine that the target synthetic polarization direction is the initial synthetic polarization direction in response to the yaw attitude change of the movable platform not exceeding a second preset angle threshold, or determine, in response to the yaw attitude change of the movable platform exceeding the second preset angle threshold and being less than or equal to a third preset angle threshold, the target synthetic polarization direction based at least in part on any of the following scenarios:

Scenario I: determine that the target synthetic polarization direction is a circular polarization direction in response to the initial synthetic polarization direction being a linear polarization direction, Scenario II: determine that the target synthetic polarization direction is a linear polarization in response to the initial synthetic polarization direction being a circular polarization, or determine, in response to the yaw attitude change of the movable platform exceeding the third preset angle threshold, the target synthetic polarization direction based at least in part on any of the following scenarios:

Scenario III: determining that the target synthetic polarization direction is a second linear polarization direction in response to the initial synthetic polarization direction being a first linear polarization direction, Scenario IV: determining that the target synthetic polarization direction is a second circular polarization direction in response to the initial synthetic polarization direction being a first circular polarization direction.

20. A system, comprising:

a remote control device;

a movable platform;

at least one non-transitory storage medium storing at least one set of instructions; and at least one processor in communication with the at least one non-transitory storage medium, wherein during operation, the at least one processor executes the at least one set of instructions to cause the remote control device to at least:

obtain first transmission antenna information of a first antenna of the movable platform, wherein the first transmission antenna information comprises a polarization direction of the first antenna to transmit electromagnetic waves, determine an initial synthetic polarization direction of a second antenna of the remote control device based at least in part on the first transmission antenna information and an initial attitude of the movable platform, obtain current attitude data indicative of an attitude change of the movable platform compared to the initial attitude, determine a target synthetic polarization direction of the second antenna based at least in part on the current attitude data and the initial synthetic polarization direction, and control the second antenna to receive and/or transmit the electromagnetic waves with the target synthetic polarization direction.

* * * * *